A. W. WINTERFIELD.
MOLD FOR CEMENT BLOCKS.
APPLICATION FILED AUG. 23, 1907.
969,232.
Patented Sept. 6, 1910.
3 SHEETS—SHEET 1.
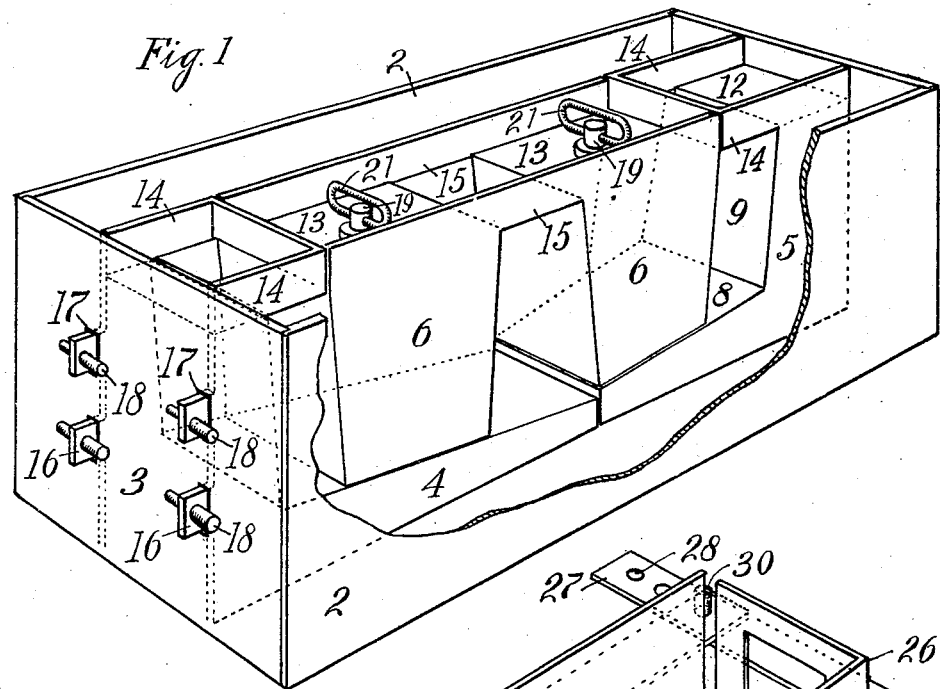
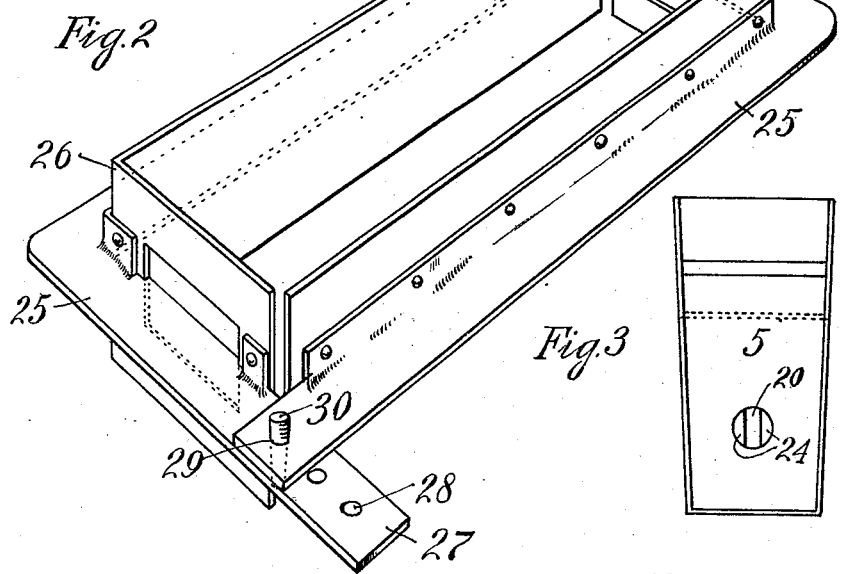
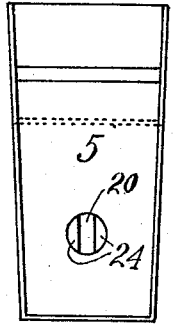
Witnesses,
George Voelker
Hattie Smith
Inventor,
Abram W. Winterfield
by Lothrop & Johnson
his Attorneys.

A. W. WINTERFIELD.
MOLD FOR CEMENT BLOCKS.
APPLICATION FILED AUG. 23, 1907.
969,232.
Patented Sept. 6, 1910.
3 SHEETS—SHEET 2.
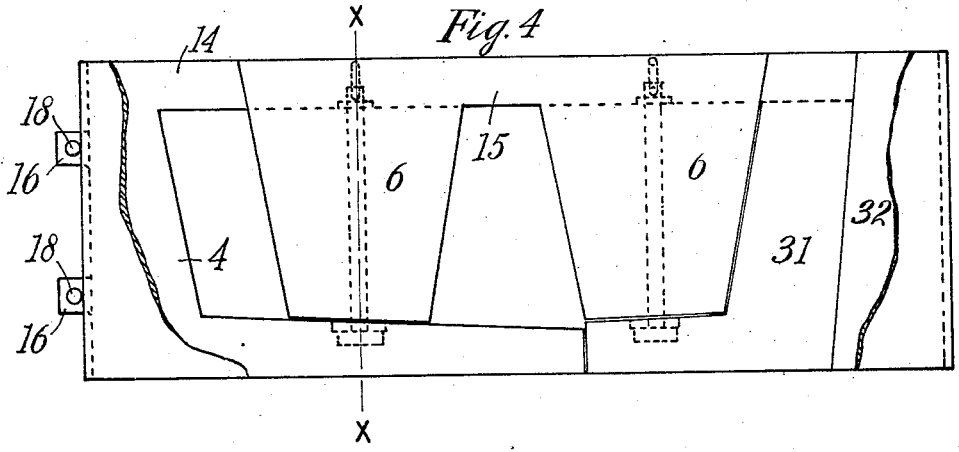
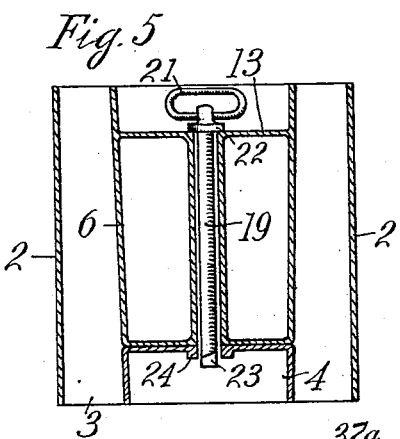
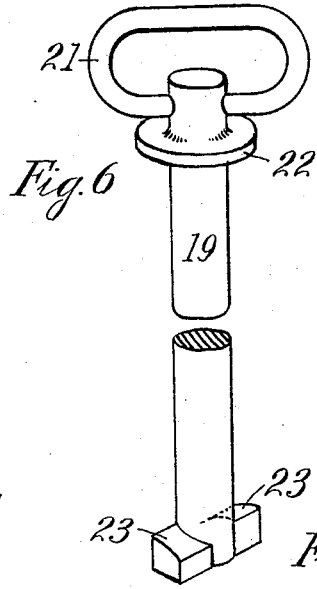
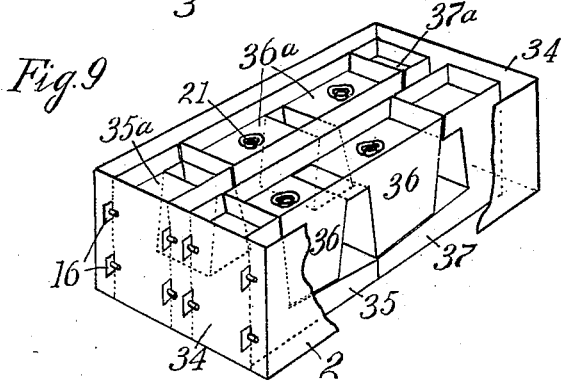
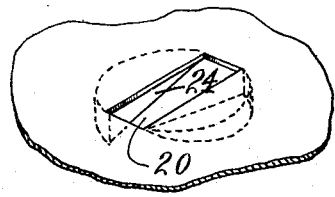
Witnesses,
George Voelker
Hattie Smith
Inventor,
Abram W. Winterfield
by Lothrop + Johnson
his Attorneys.

A. W. WINTERFIELD.
MOLD FOR CEMENT BLOCKS.
APPLICATION FILED AUG. 23, 1907.
969,232.
Patented Sept. 6, 1910.
3 SHEETS—SHEET 3.
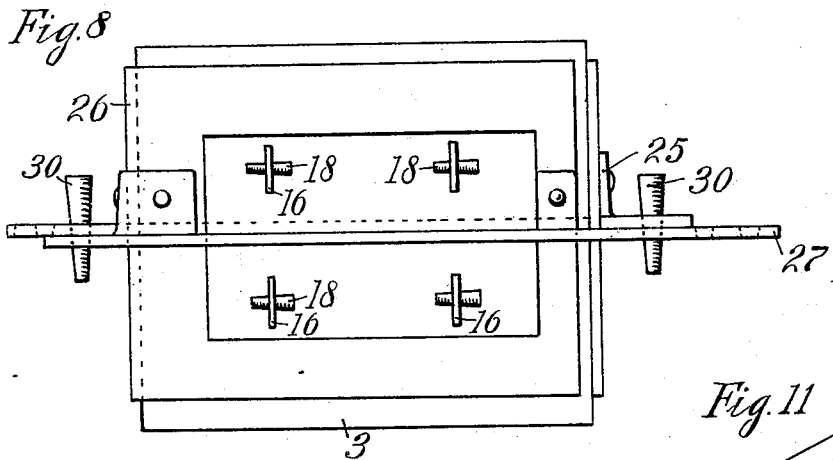
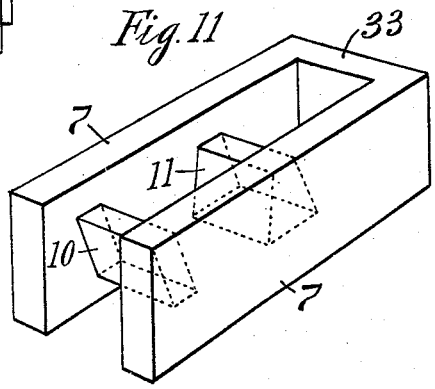
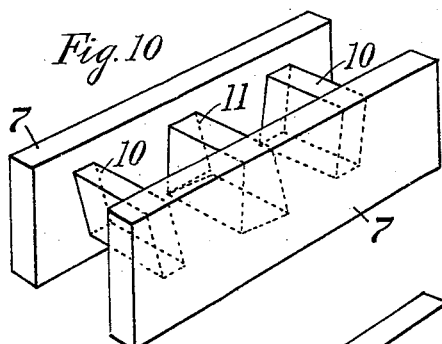
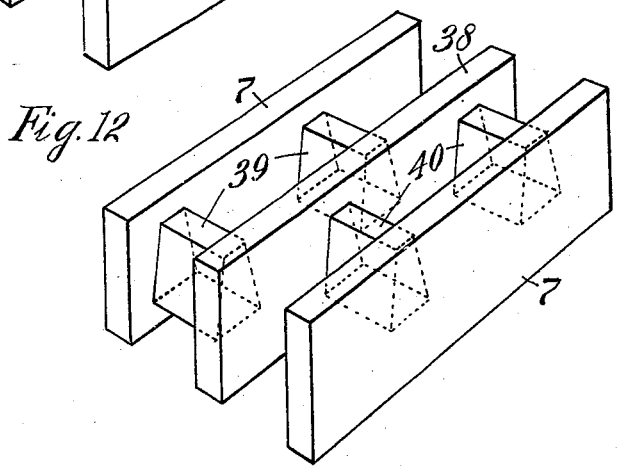
Witnesses,
George Voelker
Hattie Smith
Inventor,
Abram W. Winterfield
by Lothrop & Johnson
his Attorneys.

UNITED STATES PATENT OFFICE.

ABRAM W. WINTERFIELD, OF ST. PAUL, MINNESOTA.

MOLD FOR CEMENT BLOCKS.

969,232.

Specification of Letters Patent. Patented Sept. 6, 1910.

Application filed August 23, 1907. Serial No. 389,802.

*To all whom it may concern:*

Be it known that I, ABRAM W. WINTERFIELD, a citizen of the United States, residing at St. Paul, in the county of Ramsey and State of Minnesota, have invented certain new and useful Improvements in Molds for Cement Blocks, of which the following is a specification.

My invention relates to improvements in molds for cement blocks and is particularly designed for forming blocks having continuous air spaces, both horizontal and vertical.

Among the objects of the invention are to provide a collapsible mold wherein the parts may be readily removed from the block without waiting for the block to harden, so that the mold may be immediately put together and used over again for another block; wherein the core members may be arranged for the production of double blocks as hereinafter described; and wherein the parts are so shaped and arranged as to form blocks which are easy to handle and of various shapes according to the requirements of the work in hand.

With these and other objects in view the invention consists in the features of construction, combination and arrangement of parts hereinafter described and claimed.

In the accompanying drawings forming part of this specification, Figure 1 is a perspective view of the mold with one side of the flask partly broken away; Fig. 2 is a perspective view of the clamping frame;
Fig. 3 is a bottom view of one of the outer cores; Fig. 4 is a side view of the mold with one side of the flask broken away and containing cores constructed and arranged to form an end block; Fig. 5 is a vertical section on line *x—x* of Fig. 4; Fig. 6 is a perspective view of the locking key for the inner cores; Fig. 7 is a detail showing the key receiving slot in one of the outer cores; Fig. 8 is an end view of the mold with the clamping frame in place; Fig. 9 is a perspective view on a smaller scale showing a mold with two sets of cores arranged side by side to form a double block, with one side of the flask partly broken away; Fig. 10 is a perspective view of a block formed by the cores as shown in Fig. 1; Fig. 11 is a perspective view of an end block formed by the cores as shown in Fig. 4, and Fig. 12 is a perspective view of a double block formed by the cores as shown in Fig. 9.

As shown in the drawings the mold comprises a collapsible flask having separable side and end walls 2 and 3, but no bottom nor top, and cores removably supported within the flask as hereinafter described. The end and side walls of the flask need only abut against each other, being held together, when a block is to be formed, by means of the clamping frame shown in Fig. 2.

In the form shown in Fig. 1 the cores comprise two L-shaped outer or end cores 4 and 5, and a plurality of inner cores 6. The cores are all of substantially the same width, and are enough narrower than the flask to leave between them and the side walls of the flask spaces of the desired width for the sides 7 of the blocks to be formed. The outer cores are arranged in the flask with their bottom or horizontal legs extending in toward each other and preferably abutting. These legs form the horizontal air spaces in the block, while the upwardly extending legs form the vertical air spaces at the ends of the blocks.

To facilitate endwise separation or withdrawal of the outer cores from the cement block, their sides are sloped slightly inwardly toward the interior of the mold, as shown in Fig. 3, and the upper faces 8 of the bottom legs are made to slope downwardly toward the interior of the mold, as shown in Fig. 1. And, in order that the cement blocks may be of a shape to be easily grasped and lifted in the hands, the inner faces 9 of the upwardly extending legs of the exterior cores are made to slope downwardly and inwardly, so as to form a downwardly and inwardly inclined end bond 10, as shown in Fig. 10.

The interior cores 6 are designed to be arranged upon the bottom legs of the L-shaped cores at sufficient distances from the upper legs of those cores to form the end bonds 10 of the cement block, and at sufficient distances from each other to form between them the intermediate bond or bonds 11, as shown in Fig. 10. The cores 6 themselves form the vertical air spaces between the bonds. The cores 6 are made to slope downwardly and inwardly on all sides so as to permit of their upward withdrawal from the cement block without disturbing the same.

As it is necessary to extend the sides of the block up above the bonds to form a horizontal air space at the top, as well as at the bottom, the sides of the outer cores are extended up above their closed tops 12, and the sides of the inner cores 6 are also extended up above their closed tops 13. The cores are also formed or provided at the top with lateral strips which are in line with the upwardly extended portion of their sidewalls. These strips extend across the spaces between the cores, so that the sidewalls of the cement blocks may extend above the bonds. The strips may be carried by the core on either side of the space. In Figs. 1 and 9 each of the outer cores is shown formed with lateral strips 14 extending inwardly to abut against the adjacent inner core, and the inner cores are united at the top by means of the lateral strips 15 which are integral with the sidewalls of both cores. Thus the cores 6 may be lifted and handled as one and are permanently spaced apart the requisite distance to form between them the middle bond 11. It will be noticed that the bottom leg of one of the outer cores, in this case the core 4, is longer than the corresponding leg of the other core in order that it may extend under the entire space between the cores 6. One or both of the outer cores are made with outwardly extending lugs 16 adapted to pass through the slots 17 in the end walls of the flask and be retained therein by means of pins 18 passing through holes in the lugs. By this means the cores are centered and secured in position in the flask.

The inner cores are secured to the outer cores by means of keys 19 which pass down revolubly through the inner cores and through slots 20 in the bottom legs of the outer cores. The key is formed at the top with an operating ring or handle 21 and with a flange 22 which bears against the top 13 of the core 6. At its lower end the key is formed with oppositely disposed and inclined cam flanges 23 adapted to pass through the slot 20 and engage the oppositely disposed and inclined cams 24 upon the underside of the bottom leg of the outer cores. When the key is turned the cam flanges 23 are forced into wedging engagement with the corresponding cams 24 of the outer core, and the inner cores are thus clamped tightly to the outer cores.

To hold the side and end walls of the flask together when a block is to be formed, a clamping frame, such as that illustrated in Fig. 2, is placed about the flask. As there shown the frame comprises two L-shaped angle bars 25 to each of which is secured a side and end plate 26, the end plate being cut away at the middle for the lugs 16. Each angle bar extends beyond the side and end plates secured to it so as to overlap the adjacent end of the other angle bar. The projecting end portion 27 of each angle bar is provided with a plurality of holes 28, and the projecting side portion with one or more holes 29, so that the frame may be varied in width according to the requirements of the work in hand, and secured in adjusted positions by passing a pin 30 through the hole 29 and any desired one of the holes 28.

In use, the cores are arranged in position in the flask as shown in Fig. 1, and the clamping frame is then put about the flask and locked in position by means of the pins 30. The mold, which it will be observed has no bottom, may be placed upon a pallet or any other flat surface. The cement is then filled in between the cores up to the level of their tops 12 and 13 to form the bonds, and between the cores and the sides of the flask up to the top of the strips 14 and 15 to form the sides of the block.

After the cement has thus been filled in and tamped, the mold may be taken apart without waiting for the block to harden. It is only necessary to remove the clamping frame and disengage and withdraw the keys 19 from the outer cores, when the side and end walls of the flask may be taken apart and the cores withdrawn from the block,— the outer cores being drawn out endwise and the inner cores lifted upward. The block will be left uninjured upon the pallet or other supporting surface, and the mold may be used for another block.

In the form shown in Fig. 4 the cores and flask are constructed and arranged in precisely the same way as in Fig. 1, except that one of the outer cores 31 is made without the laterally extending strips 14, and is moved in against adjacent core 6, so as to close the space between them and to leave a space 32 between the core 31 and the end wall of the flask. In this space is formed the end wall 33 of an end-block such as is shown in Fig. 11. In this case the core 31 may be lifted out with the cores 6.

In the form shown in Fig. 9 the construction and arrangement is the same as in Fig. 4 except that the end walls 34 of the flask are enough longer than the end walls 3 in Figs. 1 and 4 to permit two sets of cores 35, 36 and 37, and 35ᵃ, 36ᵃ and 37ᵃ, to be placed side by side with sufficient space between them to form a double block, such as that shown in Fig. 12, having an intermediate wall 38. As here arranged no space is left between the outer blocks and the end walls of the flask, as in the arrangement shown in Fig. 4, and the two sets of cores are so arranged that the bonds 39 formed on one side of the walls 38 are staggered with reference to the bonds 40 on the other side of the wall. The adjacent core faces are also made divergent so as to make the bonds wedge shaped. I prefer, however, in all cases to shape the outer cores so as to form downwardly and inwardly inclined end bonds as shown in Figs. 1 and 10.

The cores may be made of any desired material, but I prefer to construct them of bent sheet metal as shown in the drawings.

While I have called the device a mold for cement blocks it is obvious that it may be used for making building blocks of any other plastic self hardening material.

I claim as my invention:

1. A mold for concrete blocks, comprising, in combination, an open ended flask, and a plurality of cores occupying an intermediate longitudinal substantially parallel sided space from end to end of said flask, said cores consisting of end members having top and bottom arms projected inwardly, and an inner arch member coöperating with said top and bottom arms to provide substantially central web spaces extending from side to side of the mold said top and bottom arms abutting and underlying said arch member to form inclosed web cores.

2. In a mold of the class described, in combination, a flask, a pair of L-shaped cores centrally arranged therein with their bottom legs extending toward each other, a plurality of inner cores resting on said bottom legs and shaped so as to allow of upward withdrawal, and a key passing revolubly through each inner core and the bottom leg of the supporting outer core, the key being formed at the top with a flange to abut against the top of the inner core and at the bottom with oppositely inclined cam flanges, and the bottom of the outer core being formed on its under face with oppositely inclined and disposed cams in position to be engaged by the cam flanges of the key.

3. A mold for concrete blocks comprising in combination, a collapsible open ended flask, a plurality of core-members carried by said flask and having longitudinally extended bases, upwardly extended flanges formed on said core-members to register with the plane of the upper edge of the flask, other core-members resting on said bases and extending upwardly to the same level as the flanges of said first mentioned cores, said flanged cores and second mentioned cores coöperating to mold a block having substantially parallel longitudinal sides, and cross bands connecting said sides to leave lateral passages and upper and lower longitudinal passages.

4. A mold of the class described, comprising a collapsible flask, a pair of endwise removable and oppositely disposed L-shaped outer cores, a plurality of upwardly removable inner cores resting upon the bottom legs of the outer cores, the inner face of the upwardly extending leg of each outer core being inclined downwardly and inwardly, and all of the cores being interspaced from each other and from the side walls of the flask, and strips carried by the cores in line with their side walls and extending over the spaces between them and adjacent cores, whereby the side walls of the block to be formed may be built up above the cross bonds thereof.

In testimony whereof I affix my signature in presence of two witnesses.

ABRAM W. WINTERFIELD.

Witnesses:
ARTHUR P. LOTHROP,
HATTIE SMITH.